H. A. GSELL.
APPARATUS FOR MEASURING OFF MATCHES FOR MACHINES FOR PACKING MATCHES IN BOXES.
APPLICATION FILED DEC. 5, 1913.
1,107,059.
Patented Aug. 11, 1914.
2 SHEETS—SHEET 1.
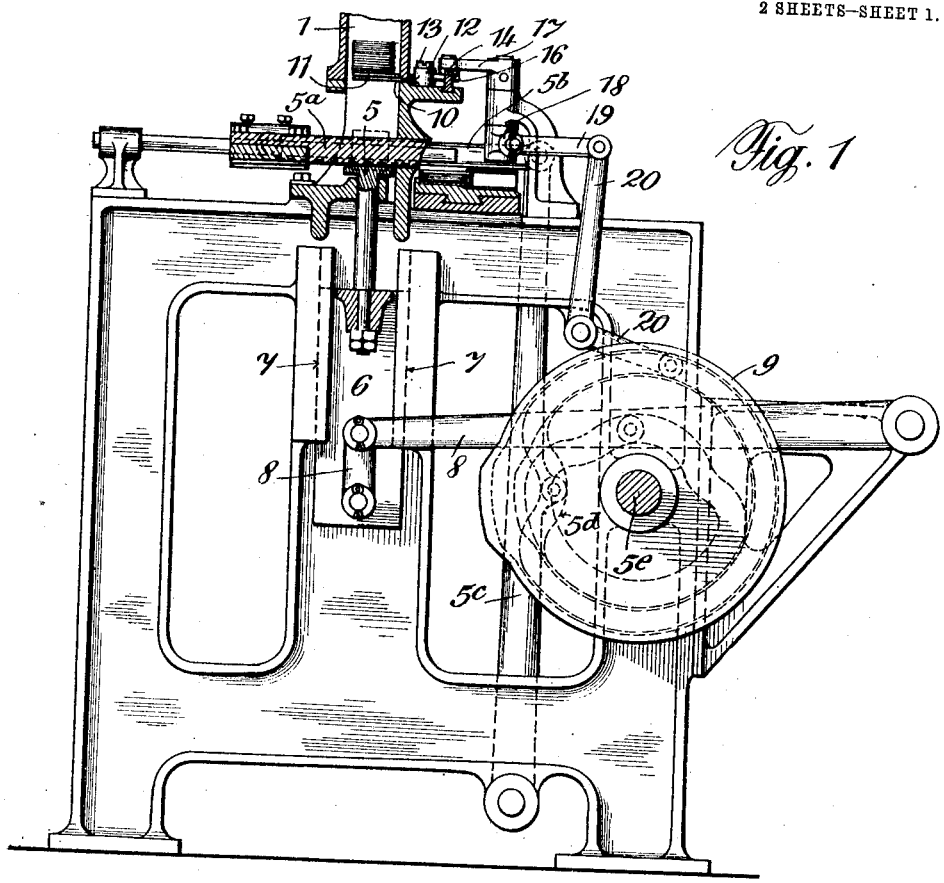
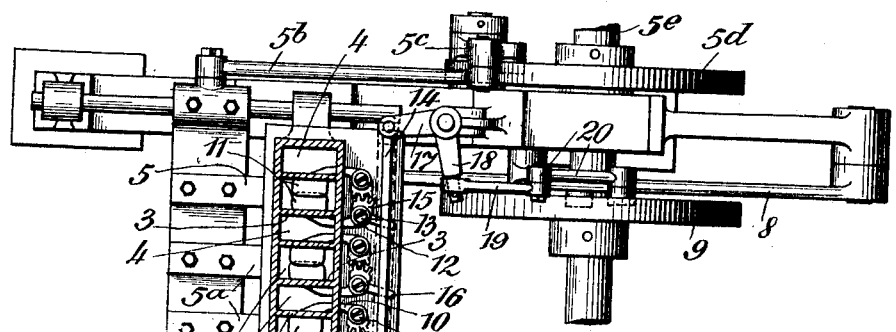
Witnesses:
Inventor:
Henry Alfred Gsell,
atty.

H. A. GSELL.
APPARATUS FOR MEASURING OFF MATCHES FOR MACHINES FOR PACKING MATCHES IN BOXES.
APPLICATION FILED DEC. 5, 1913.
1,107,059.
Patented Aug. 11, 1914.
2 SHEETS—SHEET 2.
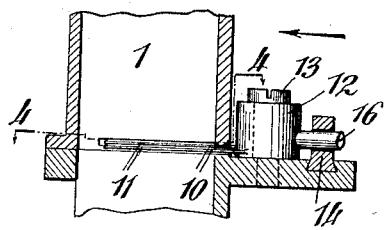
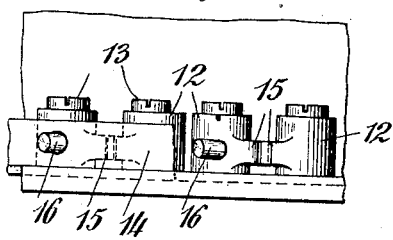
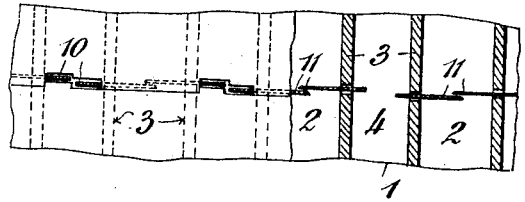
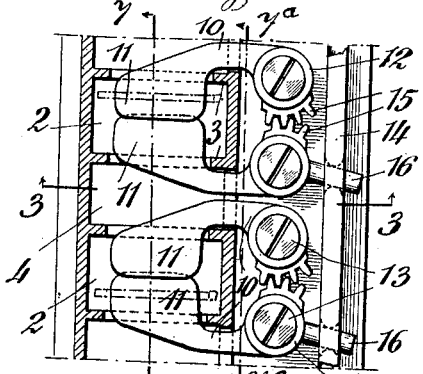
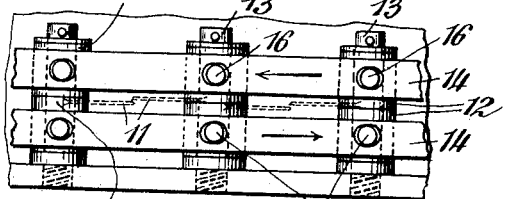
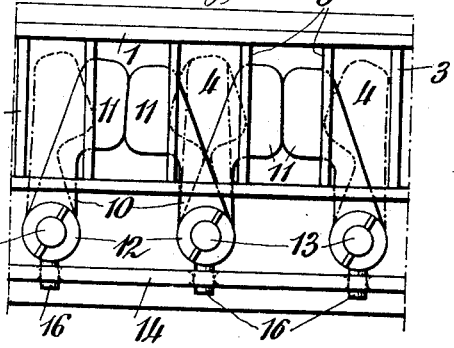
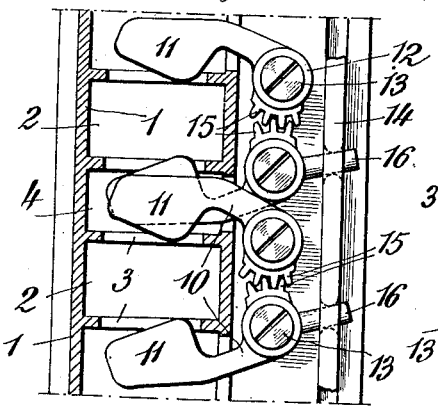
Witnesses:
B. Dommers
E. Leckert.
Inventor:
Henry Alfred Gsell.
By Henry Orth
Atty.

UNITED STATES PATENT OFFICE.

HENRY ALFRED GSELL, OF PARIS, FRANCE.

APPARATUS FOR MEASURING OFF MATCHES FOR MACHINES FOR PACKING MATCHES IN BOXES.

1,107,059.  Specification of Letters Patent.  Patented Aug. 11, 1914.

Application filed December 5, 1913. Serial No. 804,889.

*To all whom it may concern:*

Be it known that I, HENRY ALFRED GSELL, a citizen of the Republic of Switzerland, residing at Paris, France, have invented new and useful Improvements in Apparatus for Measuring Off Matches for Machines for Packing Matches in Boxes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements on the invention covered by my Patent No. 1,081,379 dated December 16, 1913.

In my aforesaid patent there is described an apparatus for measuring off matches for machines for packing matches in boxes, wherein spring slides or knives are pushed in between the matches in the longitudinal direction of the latter and coöperate with a fixed stop in such a manner that they execute only toward the end of their longitudinal movement a slight transverse movement which is sufficient for closing said slides or knives. By the said invention there has been effected, compared to the arrangements previously employed, in which the knives are pushed in between the matches in the longitudinal direction of the latter, a considerable reduction of the space between the several compartments in which the matches are filled.

In the arrangement according to my aforesaid earlier patent the knives are inserted from the front, *i. e.* between the heads of the matches, into the compartments. For the measuring off of certain kinds of matches it is, however, advisable to prevent the knives from coming in contact with the heads of the matches. It has, therefore already been proposed to make the knives of circular arc shape or of curved blade shape and to move these knives in a circle corresponding to the curved shape of the knives, so that the knives may be inserted laterally into the compartments and the considerable saving in space effected between the several filling compartments is maintained.

The present invention has now for its object to provide means permitting to attain a considerable saving in space between the several filling compartments also in apparatus of the kind, in which the knives are inserted laterally into the compartments and in which they are rotated in a horizontal plane about a vertical axis. Now, for this purpose the blades of adjacent knives of neighboring filling compartments are arranged according to the present invention in different horizontal planes, so that they may be moved one over another, thus permitting a considerable reduction of the space needed for their opening between adjacent filling compartments.

Two practical forms of the invention are illustrated by way of example in the accompanying drawings, in which—

Figure 1 is a front view, partly in section, of a machine for packing matches in boxes provided with a measuring off apparatus constructed according to the present invention; Fig. 2 is a plan view, partly in section, of a part of Fig. 1, Fig. 3 is a section on the line 3—3 of Fig. 4 through the measuring off apparatus, Fig. 4 is a horizontal section on the line 4—4 of Fig. 3, showing the measuring off knives in their closed position. Fig. 5 is a section corresponding to Fig. 4, showing the knives in their opened position. Fig. 6 is a side view of Fig. 3 seen in the direction of the arrow, shown in Fig. 3. Fig. 7 is a vertical section partly on the line 7—7 and partly on the line $7^a$—$7^a$ of Fig. 4. Figs. 8 and 9 show a front and a plan view of a second construction according to the invention, in which two knives working together are pivoted on the same axes.

As shown, 1 is the match magazine, in which the matches are arranged horizontally. This magazine is divided by means of partition walls 3 into several compartments 2, between which are arranged the spaces 4.

5 denotes the filling piston, the rod of which is connected to a part 6 which is moved up and down in a slideway 7 by means of the rods 8, 8 actuated by a cam disk 9.

$5^a$ denotes a horizontally movable piston, conveying in the usual manner the matches which are situated on the filling piston 5 into the open boxes. This piston $5^a$ is actuated by means of the rods $5^b$, $5^c$ from a cam disk $5^d$ mounted on the driving shaft $5^e$. Measuring off knives 10 are arranged above the piston 5. Each of these knives is provided with a blade 11, having a thickness of approximately 1 mm. and a much thicker sleeve-like rear part 12. According to the construction illustrated in Figs. 1–7 a screw bolt 13 is inserted in the hub or sleeve 12 of each knife 10 forming a pivot for the latter. Now, according to the present invention the blades 11 of two knives 10 working together are not arranged in the same horizontal plane, but all the knives moving toward the right hand side during their opening are arranged in one horizontal plane, while all the knives moving toward the left hand side, when they are opened, are arranged in a second horizontal plane, which is vertically displaced with regard to the first mentioned horizontal plane. Two knives working together come, therefore, to lie in their closed position partly one over the other (Figs. 4 and 7). By this arrangement a considerable advantage is attained in that the adjacent blades of two neighboring compartments 2, which blades are situated in different horizontal planes, may be moved during the opening of the knives one over the other, so that the spaces 4 between the different compartments 2 can be considerably reduced compared with the already known similar constructions.

For the purpose of opening and closing the knives 10 there is provided a rail 14 and the sleeve or hub 12 of each second knife is provided with a toothed segment 15. As shown in Figs. 2, 4 and 5 the segments 15 of each pair of knives working together engage one another. The hub 12 of each knife is provided with a radial pin 16, passing through the rail 14. These pins 16 transmit the motion of the rail 14 to the knives. The rail is moved to and fro in a horizontal plane by means of the rods 17, 18, 19, 20 and the cam disk 9 on the shaft 5ᵉ.

According to the construction illustrated in Figs. 8 and 9 the sleeves or hubs 12 of each pair of knives are arranged one over the other, so that only one screw bolt 13 has to be provided for such a pair of knives. In this case the blade 11 of the upper knife has to be provided near the lower end of the sleeve or hub 12 and the blade of the lower knife near the upper end of the sleeve or hub (see dotted lines in Fig. 8). When these knives are opened the blades 11 of a pair of knives working together and lying in different horizontal planes are moved one over the other in the manner shown in Fig. 9 in point and dash lines, so that only a small space 4 between adjacent compartments 2 is needed for their opening. As shown in Fig. 8, there have to be provided in this case two rails 14 for actuating the knives 10, viz. a rail for moving the knife blades situated in the upper horizontal plane and a rail for moving the blades situated in the lower horizontal plane.

I claim:

1. In an apparatus for measuring off matches for machines for filling matches into match boxes, a match magazine divided by vertical partition walls into several filling compartments, a vertically movable plunger for supporting the measured off matches and measuring off knives arranged in pairs near the lower end of said filling compartments, the whole of the blades of adjacent knives of neighboring filling compartments being arranged in different horizontal planes and means for rotating each of said knives on a pin fixed to the frame of the apparatus.

2. In an apparatus for measuring off matches for machines for filling matches into match boxes, a match magazine divided by vertical partition walls into several filling compartments, a vertically movable plunger for supporting the measured off matches and measuring off knives arranged in pairs near the lower end of said filling compartments, the blades of adjacent knives of neighboring filling compartments being arranged in different horizontal planes so that the knives to be opened can be moved one over the other, each knife being further provided with a sleeve like rear end, radial pins on said sleeve like parts, stationary vertical bolts passing through said sleeves, horizontally arranged rails engaging said pins and means for moving to and fro said rails.

3. In an apparatus for measuring off matches for machines for filling matches into match boxes, a match magazine divided by vertical partition walls into several filling compartments, a vertically movable plunger for supporting the measured off matches and measuring off knives arranged in pairs near the lower end of said filling compartments, the blades of adjacent knives of neighboring filling compartments being arranged in different horizontal planes, each knife being provided with a sleeve like rear end, stationary vertical pivots passing through said sleeve like parts, a toothed segment on each of said sleeves, the toothed segments of each knife pair engaging one another, a radial pin on each second of said sleeves, a horizontal rail engaging all said pins and means for moving said rail to and fro in a horizontal plane.

In testimony that I claim the foregoing as my invention, I have signed my name in presence of two subscribing witnesses.

HENRY ALFRED GSELL.

Witnesses:
HANSON C. COXE,
OSCAR SIEBENHARR.

Copies of this patent may be obtained for five cents each, by addressing the "Commissioner of Patents, Washington, D. C."